(12) United States Patent
Vontell, Sr. et al.

(10) Patent No.: US 7,789,620 B2
(45) Date of Patent: Sep. 7, 2010

(54) HEATER ASSEMBLY FOR DEICING AND/OR ANTI-ICING A COMPONENT

(75) Inventors: John Henry Vontell, Sr., Manchester, CT (US); George Alan Salisbury, East Hampton, CT (US); Charles R. Watson, Jr., Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 384 days.

(21) Appl. No.: 11/825,174

(22) Filed: Jul. 5, 2007

(65) Prior Publication Data

US 2008/0124222 A1 May 29, 2008

Related U.S. Application Data

(62) Division of application No. 11/356,329, filed on Feb. 16, 2006, now abandoned.

(51) Int. Cl.
*F01D 5/08* (2006.01)

(52) U.S. Cl. .......................................... 415/178; 416/95

(58) Field of Classification Search .................. 415/177, 415/178; 416/95; 60/39.093; 244/134 R, 244/134 B
See application file for complete search history.

(56) References Cited

U.S. PATENT DOCUMENTS

| | | |
|---|---|---|
| 4,764,668 A | 8/1988 | Hayard |
| 5,344,696 A | 9/1994 | Hastings et al. |
| 5,657,951 A | 8/1997 | Giamati |
| 5,777,297 A | 7/1998 | Gelus |
| 5,804,791 A | 9/1998 | Gelus |
| 5,925,275 A | 7/1999 | Lawson et al. |
| 5,947,418 A | 9/1999 | Bessiere et al. |
| 6,145,787 A | 11/2000 | Rolls |
| 6,402,093 B1 | 6/2002 | Wang |
| 6,725,645 B1 | 4/2004 | Wadia et al. |

*Primary Examiner*—Edward Look
*Assistant Examiner*—Dwayne J White
(74) *Attorney, Agent, or Firm*—Kinney & Lange, P.A.

(57) ABSTRACT

A heater assembly for deicing and/or anti-icing a component includes a metallic heating element adjacent to a densely woven fabric layer impregnated with a resin that is capable of withstanding temperatures of up to 550° F. (288° C.).

17 Claims, 2 Drawing Sheets

HEATER ASSEMBLY FOR DEICING AND/OR ANTI-ICING A COMPONENT

CROSS-REFERENCE TO RELATED APPLICATION(S)

This application is a division of Ser. No. 11/356,329 filed Feb. 16, 2006

STATEMENT OF GOVERNMENT INTEREST

This invention was made with Government support under contract number N00019-02-C-3003, awarded by the U.S. Navy. The U.S. Government has certain rights in this invention.

BACKGROUND

The present invention relates to a heater assembly. More particularly, the present invention relates to an electrothermal heater assembly that is suitable for removing and/or preventing ice accumulation on a gas turbine engine component.

It is desirable to minimize or prevent the formation of ice on certain components of a gas turbine engine in order to avoid problems attributable to ice accumulation. For example, if ice forms on air intake components, the flow of air into the gas turbine engine compressor may become obstructed, which then adversely affects engine operation and efficiency. Furthermore, chunks of ice that break loose from a gas turbine engine component during operation can damage other parts of the engine.

There are many existing methods of removing or preventing the formation of ice on gas turbine engine components. Among these methods is the incorporation (or embedding) of an electrothermal heating element into a gas turbine engine component that is susceptible to ice formation. The heating element may also be applied to a surface of the component. The heating element heats the susceptible areas of the component in order to help prevent ice from forming. The heating element may be a metallic heating element (e.g., a foil element) formed of stainless steel, copper, wire cloth, etc., which typically converts electrical energy into heat energy.

The metallic heating element is typically a part of a heater assembly that also includes a thermally conductive fabric layer attached to and supporting the heating element. For example, the heater assembly may be formed of a metallic heating element embedded into an epoxy fiber reinforced composite structure. In some cases, the fabric layer also electrically insulates an electrically conductive component from the heating element. Typically, multiple plies of fabric are required for sufficient electrical isolation of the metallic heater element.

When the heater assembly is embedded in a composite structure of some gas turbine engine components, the heater assembly replaces some structural elements of the composite in order to maintain the dimensions of the component. In those cases, the heating element accounts for a percentage of the composite structure that forms the component. This may affect the strength and the structural characteristics, such as the transfer of structural loads, of the component. The larger the percentage the heater assembly constitutes, the larger the reduction in composite strength of the gas turbine engine component.

In order to increase the strength of the component that includes the heater assembly, it is desirable to reduce the amount of space the heater assembly takes up in the component. One way of achieving the reduction in space is by reducing the thickness of the heater assembly.

SUMMARY

The present invention is a heater assembly suitable for deicing and/or anti-icing a gas turbine engine component. The heater assembly includes a metallic heating element and a densely woven fabric layer impregnated with a high-temperature resin capable of withstanding temperatures of up to 550° F. (288° C.).

It should be understood that the figures are not drawn to scale.

DETAILED DESCRIPTION

The present invention is an electrothermal heater assembly that includes a metallic heating element and a densely woven fabric layer impregnated with a high temperature resin that is capable of withstanding operating temperatures of up to 550° F. (288° C.). The resin reinforces the fabric layer. The metallic heating element is attached to the fabric layer using a thermoset adhesive and is electrically connected to a source of electrical power using any suitable conductor, such as a wire or flexible circuit. In one embodiment, the resin that is introduced into the fabric layer is also the thermoset adhesive that adheres the metallic heating element to the fabric layer.

The heater assembly of the present invention is suitable for incorporating (or embedding) into a composite structure of a component (i.e., an internal application), including a gas turbine engine component, or for attaching to a surface of a component (i.e., an external application) in order to deice the component and/or prevent ice from forming thereon. The heater assembly may also be used in a hybrid configuration, which includes both internal and external applications. The component may be any component that is susceptible to ice formation. For example, the component may be an aircraft component or a gas turbine engine component such as, but not limited to, a vane, an airfoil leading edge, a front bearing of the engine, a structural strut that supports the front bearing, and a duct. The component may be formed of materials such as, but not limited to, fiberglass, metal, or carbon composite.

Figure 1A:
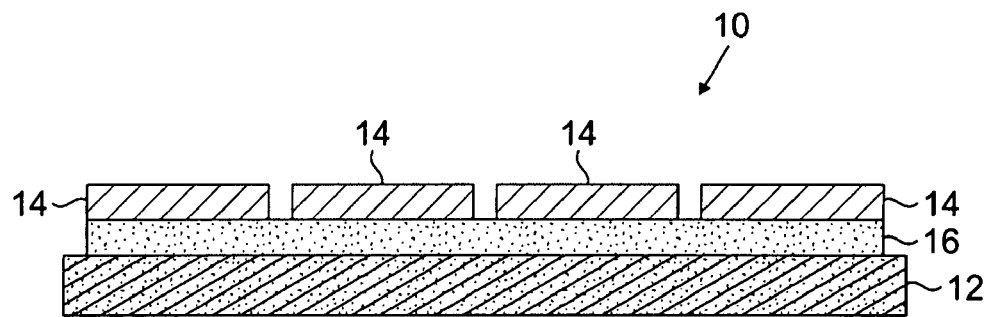
FIG. 1A is a schematic cross-sectional view of a heater assembly in accordance with a first embodiment of the present invention.

FIG. 1A is a schematic cross-sectional view of electrothermal heater assembly 10 in accordance with the present invention. Heater assembly 10 includes densely woven fabric layer 12 and metallic heating elements 14, which are attached to densely woven fabric layer 12 with thermoset adhesive 16. Fabric layer 12 is impregnated with a high-temperature resin that is capable of withstanding temperatures of up to 550° F. (288° C.). Examples of suitable high-temperature resins that may be used in accordance with the present invention include, but are not limited to, bismaleimide, phthalonitrile, cyanate ester, polyimide adhesive, and polyimide resin.

Fabric layer 12 includes about 45 to about 70 percent by volume of a fabric and about 30 to about 55 percent by volume of the high-temperature resin. In one embodiment, fabric layer 12 includes about 55 to about 60 percent by volume of the fabric and about 40 to about 45 percent by volume of the high-temperature resin. Suitable fabrics for including in fabric layer 12 include densely woven materials that have a continuous fiber. Preferably, the fabric is not easily distorted and maintains its weave pattern prior to and during the introduction of resin into the fabric during manufacture of heater assembly 10. Examples of suitable densely woven materials that may be used include a fiberglass fabric, such as Style 106, which is made commercially available by Clark Schwebel Tech-Fab Company of Anderson, S.C., and a polymer film, such as Kapton, which is made commercially available by DuPont High Performance Materials of Circleville, Ohio.

Fabric layer 12 acts as a backing material to support heating elements 14, and in some embodiments, also acts as a structural element of a component (if heater assembly 10 is embedded in the component). Because fabric layer 12 supports heating elements 14, it may also be referred to as a "structural layer." Some heating elements 14 require a backing material because they are thin and fragile and, as a result, cannot be easily handled during the manufacturing process. For example, heater assembly 10 may be etched into a shape prior to application in or on a component. The shape typically depends upon the type of component and the area of the component that requires deicing and/or anti-icing. Some of these fragile heating elements 14 tend to break apart during the etching process without a backing material (i.e., fabric layer 12). Fabric layer 12 contributes to the mechanical integrity of heating elements 14.

In comparison to many fabric layers in existing heating assemblies, fabric layer 12 of the present invention is load bearing and more stiff, due to the type of the fabric that is selected for including in fabric layer 12. As a result, if heater assembly 10 is embedded into a component, fabric layer 12 contributes to the structural integrity of the component and can act as a structural element of the component, rather than merely taking up space in the component that could be occupied by a structural element. The fabric material included in fabric layer 12 may also constitute all or substantially all of the structural material in a composite component, such as a vane.

In some embodiments, fabric layer 12 is also electrically insulating and configured to electrically insulate an electrically conductive component, such as one formed of a carbon composite or a metal alloy, from metallic heating elements 14, while at the same time, thermally conduct heat generated by heating elements 14. In situations where fabric layer 12 also electrically insulates heating elements 14, it is desirable for the fabric material forming fabric layer 12 to be woven tightly enough to be electrically insulating. Electrically insulating materials that may be used to form fabric layer 12 include fiberglass, Nextel or another suitable ceramic fiber fabric.

A thickness of heater assembly 10 is minimized because fabric layer 12 is thinner than many existing heating assemblies, which include structural layers that are about 0.020 inches (0.0508 centimeters) thick. In contrast, heater assembly 10 of the present invention includes fabric layer 12 that is less than about 0.005 inches (0.0127 centimeters) thick. In one embodiment, fabric layer 12 is about 0.003 inches (0.00762 centimeters) to about 0.005 inches (0.0127 centimeters) thick. Given the increased structural integrity of fabric layer 12, and in some embodiments, its ability to electrically insulate heating elements 14, it has been found that only one layer of material is typically required to form fabric layer 12. Of course, fabric layer 12 may also be formed of multiple layers of material.

If fabric layer 12 is also an electrically insulating layer, the thickness of fabric layer 12 varies depending on the voltage feeding heating elements 14. When heater assembly 10 is embedded in a component, the amount of structural material of the component that is displaced by heater assembly 10 is reduced because the thickness of heater assembly 10 is reduced. Furthermore, as previously discussed, fabric layer 12 is also load bearing, and in some embodiments, is a suitable structural substitution for structural elements of the component. As a result, the component is more structurally sound than a similar component that incorporates an existing heater assembly. Reducing a thickness of fabric layer 12 of heater assembly 10 helps reduce the weight of heater assembly 10, which may be desirable in the case of gas turbine engine components, which are used in aircrafts.

Those skilled in the art recognize that it is important for heater assembly 10 to distribute heat substantially evenly. Thermal conductivity of fabric layer 12 contributes to the even distribution of heat that is generated by heating elements 14. In the embodiment of FIG. 1A, fabric layer 12 exhibits a thermal conductivity value of 10.1 BTU-in/hr-ft$^2$-° F. (1.45 W/m-K).

In many existing heating assemblies that include structural layers having a thickness of about 0.020 inches (0.0508 centimeters) or greater, the heating assemblies include thick heating elements in order to achieve the necessary operating temperatures through the thick fabric layers. It has been found that is difficult to incorporate these heating assemblies into a component having a small radius (e.g., less than about 0.50 inches (1.27 centimeters)) because the thick heating elements fracture upon bending around a radius of less than about 0.50 inches (1.27 centimeters). Heater assembly 10 in accordance with the present invention, however, is more flexible than many of these existing heating assemblies due to the thinner fabric layer 12. In combination with suitably thin metallic heating elements 14 (e.g., about 0.5 mils (0.00127 centimeters) to about 40 mils (0.1016 centimeters)), heater assembly 10 can be used with components having a small radius while retaining the full capability of heater assembly 10.

Metallic heating elements 14 are resistive heating elements, such as titanium, stainless steel, copper or wire cloth heating elements, which convert electrically energy into thermal heat, as is known in the art. Although FIG. 1A illustrates four heating elements 14, heater assembly 10 may include any number of heating elements 14, and those skilled in the art can modify the number of heating elements depending upon the specific application of heater assembly 10. Heating elements 14 are each electrically connected to an electrical power source using any suitable conductor, such as a wire or a flexible circuit. Various power arrangements may be used to provide power to heating elements 14 of heater assembly 10. For example, heating elements 14 may be electrically connected to one another, or each of the heating elements 14 may be separately electrically connected to the power source. The electrical energy may be intermittently or continuously supplied to heating elements 14, depending upon whether a deicing or anti-icing function is desired. Typically, in the case of a deicing function, power is intermittently supplied to heating elements 14, whereas in an anti-icing function, power is continuously supplied to heating elements 14.

Metallic heating elements 14 each include a watt density in a range of about 1 to about 50 watts/in$^2$ (7.75 watts/cm$^2$). The watt density, however, varies depending on the particular application of heater assembly 10. Similarly, in some embodiments, the watt density varies between heating elements 14. In some situations, it may be desirable for more heat to be applied to one area than to an adjacent area. This is often referred to as "zone" heating. To achieve zone heating, heater assembly 10 includes at least two heating elements 14 having different watt densities. The zone heating may require a secondary power distribution system in order to vary the power distribution between heating elements 14.

Metallic heating elements 14 are capable of operating at temperatures of up to 550° F. (288° C.) due to the high-temperature resin that impregnates fabric layer 12. Many existing heating assemblies include a structural layer impregnated with a resin, such as epoxy, that is unable to withstand temperatures greater than 300° F. (148.89° C.). In those cases, the integrity of the fabric layer is compromised and the heating elements may become detached from the fabric layer if the heater assembly operates at temperatures greater than 300° F. (148.89° C.) and if the heater assembly is exposed to temperatures greater than 300° F. (148.89° C.). The high-temperature resin in heater assembly 10, however, is able to withstand temperatures of up to 550° F. (288° C.), thereby helping to maintain the integrity of heater assembly 10 at temperatures greater than 550° F. (288° C.).

The ability of heater assembly 10 to withstand and operate at higher temperatures increases the number of applications heater assembly 10 may be used in because heater assembly 10 may be used to deice/anti-ice gas turbine engine components that operate at temperatures greater than 300° F. (148.89° C.). Many existing heating assemblies that use resin that cannot withstand temperatures greater than about 300° F. (148.89° C.) will fail and be unable to deice and anti-ice components that operate at higher operating temperatures (i.e., the temperatures between 300° F. (148.89° C.) and up to 550° F. (288° C.)).

In one method of forming heater assembly 10, a layer of thermoset adhesive 16 is applied to a ply of high-density material that forms fabric layer 12. Heating elements 14 are then positioned on the layer of thermoset adhesive 16 and positioned with respect to one another as desired. High-temperature resin is then injected into the material, thereby impregnating the material with the resin and forming fabric layer 12. The resin and thermoset adhesive are then cured, and as a result, heating elements 14 are adhered to fabric layer 12 after the curing step. The resulting heater assembly 10 may then be etched into a shape suitable for the specific application of heater assembly 10.

Figure 1B:
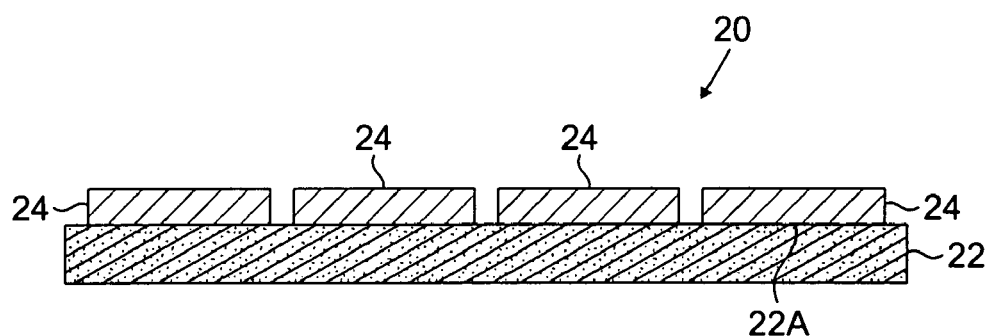
FIG. 1B is a schematic cross-sectional view of a heater assembly in accordance with a second embodiment of the present invention.

FIG. 1B is a schematic cross-sectional view of electrothermal heater assembly 20 in accordance with a second embodiment of the present invention. Heater assembly 20 includes densely woven fabric layer 22, which is impregnated with a high-temperature resin, and metallic heating elements 24, which are adhered to fabric layer 22 with the high-temperature resin. Fabric layer 22 is similar to fabric layer 12 of heater assembly 10 of FIG. 1, and heating elements 24 are similar to heating elements 14 of heater assembly 10. Rather than using a separate layer of adhesive (e.g., adhesive 16 of heater assembly 10 of FIG. 1A), the high-temperature resin that impregnates fabric layer 22 also adheres metallic heating elements 24 to fabric layer 22. Although the high-temperature resin adheres metallic heating elements 34 and fabric layer 22, the resin is not a distinct layer. In one method of forming heater assembly 20, heating elements 24 may be positioned next to a ply of material that forms fabric layer 22. A high-temperature resin is then injected into the ply of material and the resin is cured (thereby forming fabric layer 22). After fabric layer 22 is injected with resin, resin is present along surface 22A of fabric layer 22, on which heating elements 24 are positioned. Therefore, after the resin on surface 22A is cured, the cured resin along surface 22A acts as an adhesive to adhere heating elements 24 to fabric layer 22.

Figure 1C:
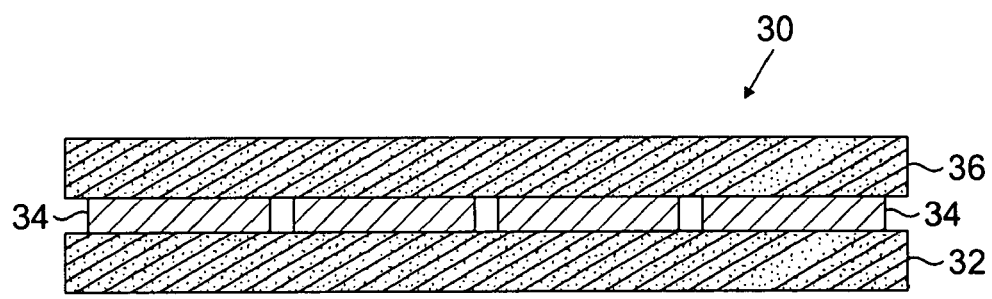
FIG. 1C is a schematic cross-sectional view of a heater assembly in accordance with a third embodiment of the present invention.

FIG. 1C is a schematic cross-sectional view of electrothermal heater assembly 30 in accordance with a third embodiment of the present invention. Heater assembly includes fabric layers 32 and 36 and heating elements 34, which are adhered to fabric layers 32 and 36 with a high-temperature resin. Fabric layers 32 and 36 are similar to fabric layers 12 and 22 of FIGS. 1A and 1B, respectively, and heating elements 34 are similar to heating elements 14 and 24 of FIGS. 1A and 1B, respectively. Heater assembly 30 is similar to heater assembly 20 of FIG. 1B, except that second fabric layer 36 is adhered to heating elements 34. If fabric layers 32 and 36 are electrically insulative and heater assembly 30 is embedded into or attached to an external surface of electrically conductive component, fabric layers 32 and 36 electrically insulate the electrically conductive component from heating elements 34.

A method similar to the method discussed above in reference to heater assembly 20 may be used to form heater assembly 30. However, a second ply of material is positioned adjacent to heating elements 34 so that heating elements 34 are "sandwiched" between the plies of material. The high-temperature resin is then injected into the plies of material and the resin is cured. The cured resin adheres heating elements 24 to fabric layer 36.

The first embodiment of heater assembly 10 (FIG. 1A) may also be modified to include a second fabric layer to electrically insulate heating elements 14. However, because a separate thermoset adhesive 16 is used in heater assembly 10, a second layer of thermoset adhesive is used to adhere heating elements 14 to the second fabric layer.

Figure 2:
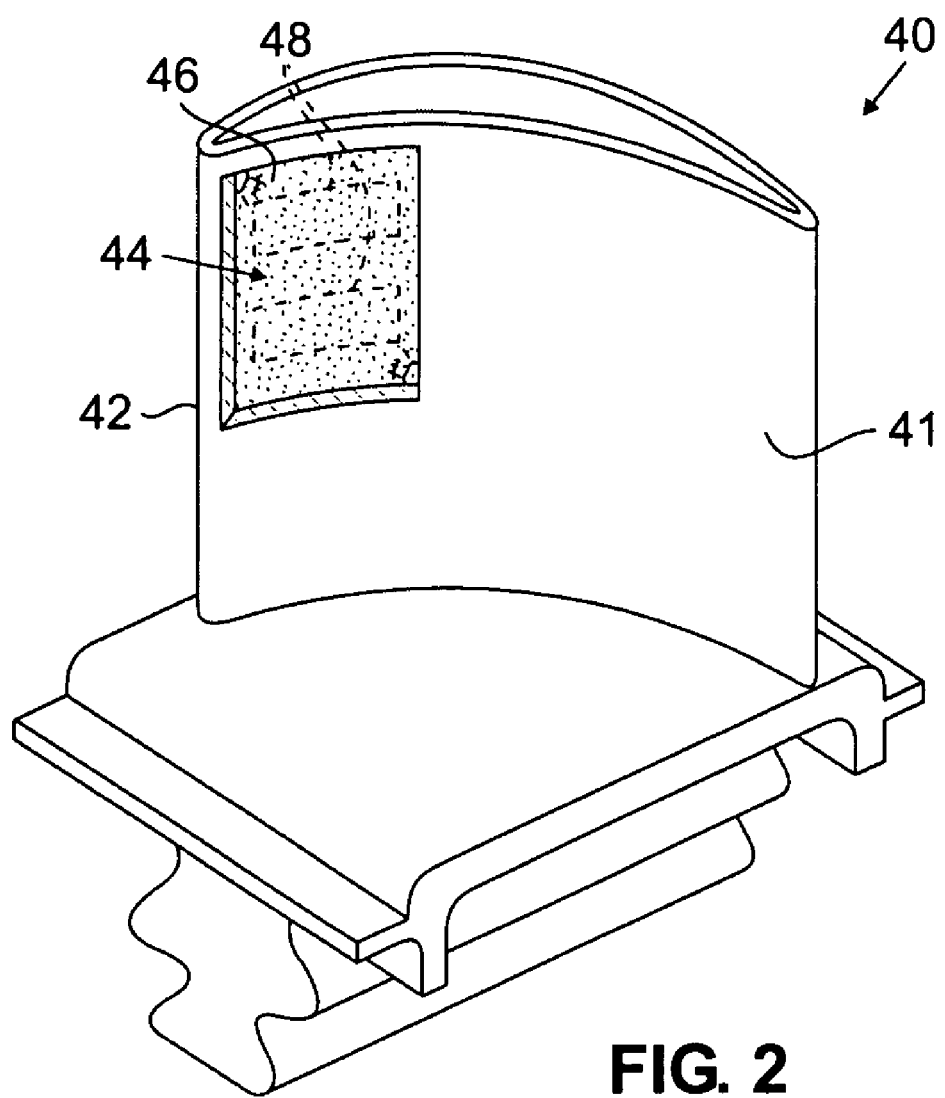
FIG. 2 is a perspective view of an airfoil, which is cut-away to show a heater assembly that is embedded along a leading edge of the airfoil.

A heater assembly in accordance with the present invention (e.g., heater assemblies 10, 20 and 30) may be embedded in a composite component. FIG. 2 illustrates an embodiment of a composite component that includes a heater assembly. FIG. 2 is a perspective view of airfoil 40, where a portion of body 41 of airfoil 40 has been cutaway along leading edge 42 to expose heater assembly 44. Body 41 of airfoil 40 is a composite structure, and heater assembly 44 is embedded in body 41 as part of the composite. Heater assembly 44 is similar to heater assembly 10 of FIG. 1A, and includes fabric layer 46 embedded with a high-temperature resin and heating elements 48 (in phantom), which are attached to fabric layer 46 using a thermoset adhesive. As shown, fabric layer 46 is positioned between the exterior surface of body 41 and heating elements 48. However, other configurations are also contemplated.

Airfoil 40 is a gas turbine engine component, and may be, for example, an airfoil in a compressor. If the gas turbine engine is used in an aircraft, moisture may accumulate on leading edge 42 of airfoil 40, and as the aircraft reaches higher elevations and the atmospheric temperature decreases, the moisture may turn into ice. In order to prevent the accumulation of ice (i.e., anti-ice) along leading edge 42 of airfoil 40, or remove the ice (i.e., deice) therefrom, heater assembly 44 is embedded in leading edge 42. As heating elements 48 receive electrical energy from an external power source (not shown), heating elements 48 convert the electrical power into thermal energy, thereby heating leading edge 42 of airfoil 40. Leading edge 42 of airfoil 40 is heated sufficiently enough to melt any accumulated ice and/or prevent ice from forming on leading edge 42.

The terminology used herein is for the purpose of description, not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

Although the present invention has been described with reference to preferred embodiments, workers skilled in the art will recognize that changes may be made in form and detail without departing from the spirit and scope of the invention.

The invention claimed is:

1. A gas turbine engine component comprising:
a component body susceptible to ice formation; and
an electrothermal heater assembly for anti-icing and deicing a component, the component body electrothermal heater assembly comprising:
a metallic heating element; and
a densely woven fabric layer adjacent to the metallic heating element and attaching the metallic heating element to the component body, the fabric layer impregnated with a thermoset adhesive capable of being load-bearing at a heater assembly operating temperature of up to 550° F., wherein the fabric layer includes a fabric material selected from a group consisting of a fiberglass fabric, a ceramic fiber fabric, polymer film, and combinations thereof; and wherein the fabric layer includes about 45 to about 70 percent by volume of the fabric material and about 30 to about 55 percent by volume thermoset adhesive.

2. The gas turbine engine component of claim 1, wherein the thermoset adhesive is selected from a group consisting of: bismaleimide, phthalonitrile, cyanate ester, polyimide adhesive, and polyimide resin.

3. The gas turbine engine component of claim 1, wherein the fabric layer is less than about 0.005 inches thick.

4. The gas turbine engine component of claim 1, wherein the metallic heating element is a titanium heating element.

5. The gas turbine engine component of claim 1, wherein the heating element has a watt density in a range of about 1 to about 50 watts/in$^2$.

6. The gas turbine engine component of claim 1, wherein the metallic heating element is about 0.5 to about 40 mils thick.

7. The gas turbine engine component of claim 1, wherein the fabric layer exhibits a thermal conductivity value of about 10.1 BTU-in/hr-ft$^2$-° F.

8. A gas turbine engine component comprising:
a component body susceptible to ice formation;
a metallic heating element, wherein the heating element has a watt density in a range of about 1 to about 50 watts/in$^2$, and wherein the metallic heating element is about 0.5 to about 40 mils thick; and
a densely woven fabric layer attached to the metallic heating element and the component body and impregnated with a thermoset adhesive capable of being load-bearing at a heater assembly operating temperature of up to 550° F., wherein the fabric layer includes a fabric material selected from a group consisting of a fiberglass fabric, a ceramic fiber fabric, polymer film, and combinations thereof; and
wherein the fabric material accounts for about 45 to about 70 percent by volume of the fabric layer, wherein the fabric layer is less than about 0.005 inches thick, and wherein the fabric layer exhibits a thermal conductivity value of about 10.1 BTU-in/hr-ft$^2$-° F.

9. The gas turbine engine component of claim 8, wherein the thermoset adhesive is selected from a group consisting of bismaleimide, phthalonitrile, cyanate ester, polyimide adhesive, and polyimide resin.

10. The gas turbine engine component of claim 8, wherein the metallic heating element is a titanium heating element.

11. The gas turbine engine component of claim 8, wherein the fabric material accounts for about 55 to about 60 percent by volume of the fabric layer.

12. A gas turbine engine component comprising:
a component body susceptible to ice formation;
a metallic heating element having first and second surfaces, a watt density in a range of about 1 to about 50 watts/in$^2$, and a thickness of about 0.5 to about 40 mils; and
a first densely woven fabric layer adhered to the first surface of the metallic heating element and to the component body and impregnated with a thermoset adhesive capable of being load-bearing at a heater assembly operating temperature of up to 550° F., wherein the first densely woven fabric layer includes a fabric material selected from a group consisting of a fiberglass fabric, a ceramic fiber fabric, polymer film, and combinations thereof, the first densely woven fabric layer being positioned to make direct contact with a portion of the gas turbine engine component.

13. The gas turbine engine component of claim 12, wherein the first densely woven fabric layer is less than about 0.005 inches thick.

14. The gas turbine engine component of claim 12, wherein the metallic heating element is a titanium heating element.

15. The gas turbine engine component of claim 12, wherein the first densely woven fabric layer exhibits a thermal conductivity value of about 10.1 BTU-in/hr-ft$^2$-° F.

16. The gas turbine engine component of claim 12, wherein the fabric material accounts for about 45 to about 70 percent by volume of the first densely woven fabric layer.

17. The gas turbine engine component of claim 12, and further comprising:
a second densely woven fabric layer adhered to the second surface of the metallic heating element and impregnated with a resin capable of withstanding a heater assembly operating temperature of up to 550° F., wherein the second densely woven fabric layer includes of a fabric material selected from a group consisting of a fiberglass fabric, a ceramic fiber fabric, a polymer film, and combinations thereof.

* * * * *